United States Patent
De Nicolo et al.

(10) Patent No.: US 11,178,995 B2
(45) Date of Patent: Nov. 23, 2021

(54) EXHAUSTED POWDER MATERIAL COLLECTION CONTAINER IN A BEVERAGE PREPARATION MACHINE

(71) Applicant: CARIMALI S.P.A. CON SOCIO UNICO, Bergamo (IT)

(72) Inventors: Michele De Nicolo, Concorezzo (IT); Pierangelo Vanzulli, Gerenzano (IT); Massimo Pelletta, Viguzzolo (IT)

(73) Assignee: CARIMALI S.P.A. CON SOCIO UNICO, Bergamo (IT)

( * ) Notice: Subject to any disclaimer, the term of this patent is extended or adjusted under 35 U.S.C. 154(b) by 367 days.

(21) Appl. No.: 16/319,456

(22) PCT Filed: Jul. 21, 2017

(86) PCT No.: PCT/IB2017/054443
§ 371 (c)(1),
(2) Date: Jan. 21, 2019

(87) PCT Pub. No.: WO2018/015935
PCT Pub. Date: Jan. 25, 2018

(65) Prior Publication Data
US 2020/0205600 A1 Jul. 2, 2020

(30) Foreign Application Priority Data
Jul. 22, 2016 (IT) .................. 102016000077364

(51) Int. Cl.
*A47J 31/36* (2006.01)
*A47J 31/60* (2006.01)

(52) U.S. Cl.
CPC .......... *A47J 31/3619* (2013.01); *A47J 31/60* (2013.01)

(58) Field of Classification Search
CPC .............. B01F 7/00408; B01F 7/00433; B01F 7/00441; B01F 7/08; A47J 31/3619
(Continued)

(56) References Cited

U.S. PATENT DOCUMENTS 484,851 A * 10/1892 Faust ................ B01F 7/08
366/278
3,897,723 A * 8/1975 Lucy, Jr. ............. A22C 5/00
99/467
(Continued)

FOREIGN PATENT DOCUMENTS

CN 102066203 A 5/2011
CN 102871553 A 1/2013
(Continued)

OTHER PUBLICATIONS

First Chinese Office Action in related Chinese Patent Application No. 201780045450.4, dated Sep. 25, 2019, 8 pages.
(Continued)

*Primary Examiner* — John J Norton
(74) *Attorney, Agent, or Firm* — FisherBroyles, LLP; Robert Kinberg

(57) ABSTRACT

A collection container to collect exhausted powder material discharged by a brewing device in a beverage preparation machine. The collection container has a receiving zone to receive the exhausted powder material and is provided with conveying means operable to convey the exhausted powder material so as to spread it inside the collection container and reduce its piling up in the receiving zone.

6 Claims, 5 Drawing Sheets

(58) Field of Classification Search
USPC .......................................................... 366/320
See application file for complete search history.

(56) References Cited

U.S. PATENT DOCUMENTS

| | | | | | |
|---|---|---|---|---|---|
| 4,577,564 | A | * | 3/1986 | Tomita | F23G 5/444 |
| | | | | | 110/110 |
| 4,784,050 | A | * | 11/1988 | Cavalli | A47J 31/3614 |
| | | | | | 99/285 |
| 4,861,216 | A | * | 8/1989 | Fullemann | B65D 88/68 |
| | | | | | 414/326 |
| 4,993,315 | A | * | 2/1991 | Huber | A47J 31/3609 |
| | | | | | 99/289 R |

FOREIGN PATENT DOCUMENTS

| | | |
|---|---|---|
| EP | 2181630 A1 | 5/2010 |
| EP | 2545823 A1 | 1/2013 |
| JP | 2001-222761 A | 8/2001 |
| WO | 2009/153298 A1 | 12/2009 |
| WO | 2014/078893 A1 | 5/2014 |
| WO | 2015091162 A1 | 6/2015 |

OTHER PUBLICATIONS

International Search Report and Written Opinion of the International Searching Authority for PCT/IB2017/054443 dated Oct. 30, 2017.

* cited by examiner

EXHAUSTED POWDER MATERIAL COLLECTION CONTAINER IN A BEVERAGE PREPARATION MACHINE

CROSS-REFERENCE TO RELATED APPLICATIONS

This application is a U.S. National Stage Application of International Patent Application No. PCT/IB2017/054443, filed Jul. 21, 2017, which claims the benefit of Italy Patent Application No. 102016000077364, filed Jul. 22, 2016.

FIELD OF THE INVENTION

The present invention relates to a collection container to collect exhausted powder material in a beverage preparation machine.

In particular, the present invention finds advantageous application in automatic beverage preparation machines comprising at least a brewing device in which a beverage, in particular coffee, is prepared by feeding hot pressurised water through a dose of powder material in a brewing chamber.

A brewing device of this type generally comprises a brewing cylinder, a closure body, which is movable relative to the brewing cylinder, to and from a sealing position in which an open top end of the brewing cylinder is fluid-tightly sealed, and a piston, which is slidably mounted in the brewing cylinder and defines, with the brewing cylinder, the afore-mentioned brewing chamber, to which the material to be brewed is fed through the open top end of the cylinder.

BACKGROUND

A brewing device of this type is known, for example, from EP 1005821 A. During operation, a preparation cycle of a beverage, e.g., coffee, begins by feeding a dose of coffee powder into the brewing chamber and subsequently displacing the closure body into the sealing position to seal the brewing chamber. Then, the piston is axially moved towards the closure body to reduce the volume of the brewing chamber and compress the coffee powder to a predetermined degree of compaction, and a certain amount of pressurized hot water is fed into the brewing chamber. The beverage thus obtained flows out of the brewing chamber and may reach, through an outlet duct, a cup or other container external to the machine.

At the end of the beverage dispensing process, the residual brewing material, which is in the form of an exhausted coffee powder cake, is extracted from the brewing chamber by lifting the piston, and then swept away by a wiper, which, while moving relative to the brewing cylinder, close to the piston head, pushes the coffee powder cake sideways until it falls down into a collection container arranged beneath the brewing device.

In the above-described beverage preparation machines, a problem exists as to how to manage the residual brewing material inside the collection container and, in particular, as to how to prevent the residual material falling into the collection container from rapidly piling up, until reaching the brewing device arranged above, thus resulting in only part of the volume of the container being exploited.

This problem is particularly severe in beverage preparation machines for domestic or bar use; in these cases, in fact, the need to minimize the size of the machine implies the need to reduce as much as possible the empty spaces between the internal components of the machine. In the case of the collection container, the reduction of the empty space, i.e., the distance, between the brewing device and the collection container results in a smaller amount of residual material collectable in the collection container without the residual material pile interferes with the brewing device above.

In order to alleviate this problem, a few solutions have been proposed, generally based on breaking the exhausted coffee powder cakes before they fall into the collection container so as to minimize as much as possible the volume occupied by the cakes in the container. A solution of this type is disclosed, for example, in US 2011/0146498 A1.

Another solution, known from EP 2545823 B, comprises associating to an oscillating member of the brewing device a levelling member, which, by moving above the discharge area of the exhausted material expelled from the brewing chamber, prevents the top of the pile of exhausted material that forms in the collection container from reaching the brewing device above.

Some other solutions to dispose the residual brewing material are known from EP 2 181630 A1 and WO 2009/153298 A1.

EP 2 181630 A1 discloses a collection container, which is adapted to receive compressed cakes of exhausted powder material and is provided with a motorised impeller operable to break the cakes falling into the collection container, and a water supply conduit provided to mix the residual material with water and allow the water-material mixture to flow out of the collection container through a discharge duct.

WO 2009/153298 A1 discloses a machine for processing exhausted capsules, particularly for separating the plastic or aluminium bodies of the capsules from the residual material contained therein so as to allow their separate disposal.

Although the above-described solutions represent improvements, they, however, fail to solve the above-described problem effectively and, moreover, generally result in an increase in the overall size of the brewing device.

SUMMARY OF THE INVENTION

The object of the present invention is to provide a collection container to collect exhausted powder material for a beverage preparation machine, which collection container allows the exhausted powder material to be simply, effectively and relatively inexpensively spread in the collection container.

According to the present invention, a collection container to collect exhausted powder material for a beverage preparation machine is provided, as claimed in the appended claims.

DETAILED DESCRIPTION

The present invention will now be described in detail with reference to the accompanying figures in order to allow a skilled person to implement it and use it. Various modifications to the described embodiments will be readily apparent to those skilled in the art and the general principles described may be applied to other embodiments and applications, without however departing from the protective scope of the present invention as defined by the appended claims. Therefore, the present invention should not be regarded as limited to the embodiments described and illustrated herein, but should be given the broadest protective scope consistent with the described and claimed principles and features.

Figure 1:
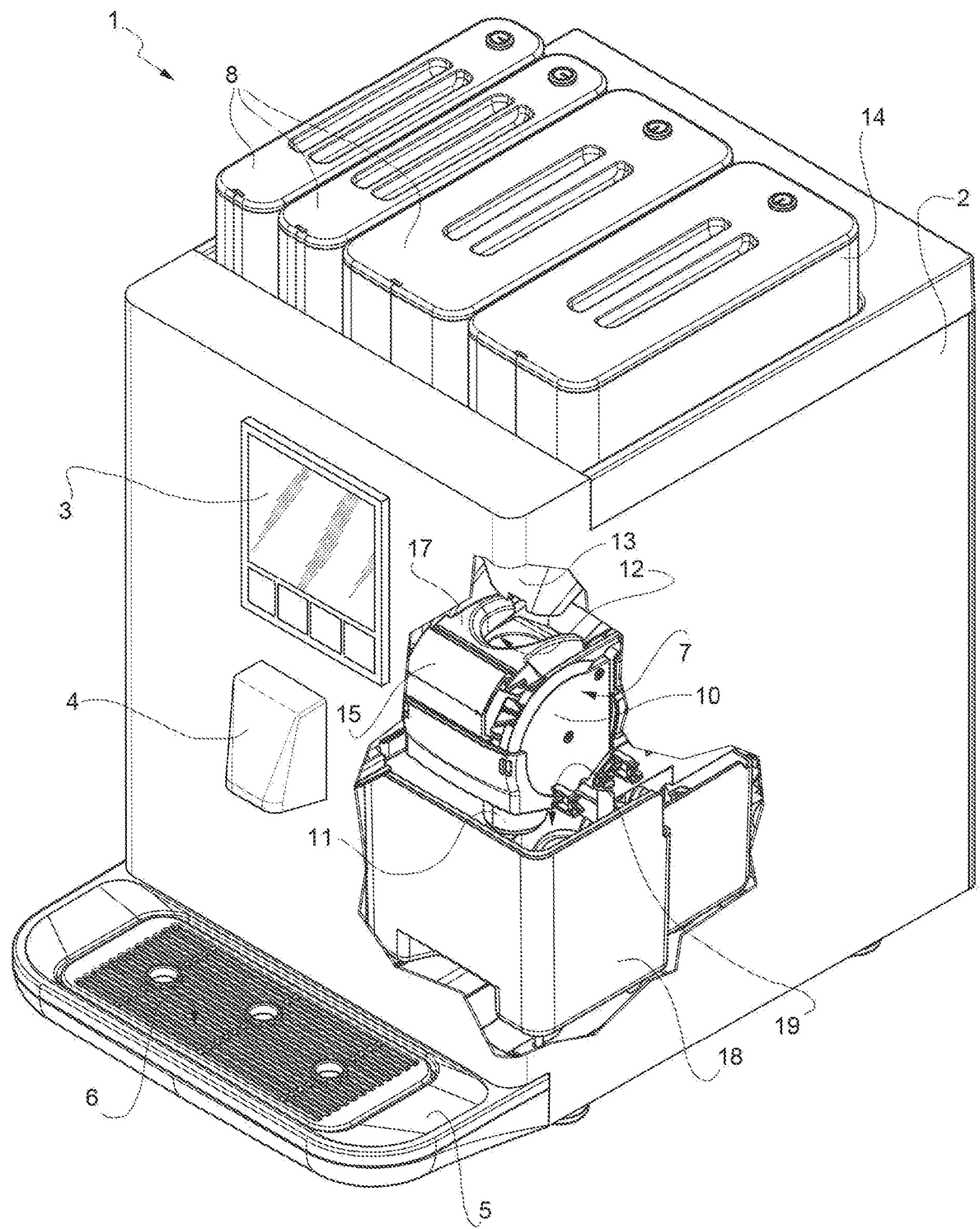
FIG. 1 is a perspective view of a beverage preparation machine featuring an exhausted powder material collection container according to a preferred embodiment of the present invention, with parts removed for clarity.
Figure 2:
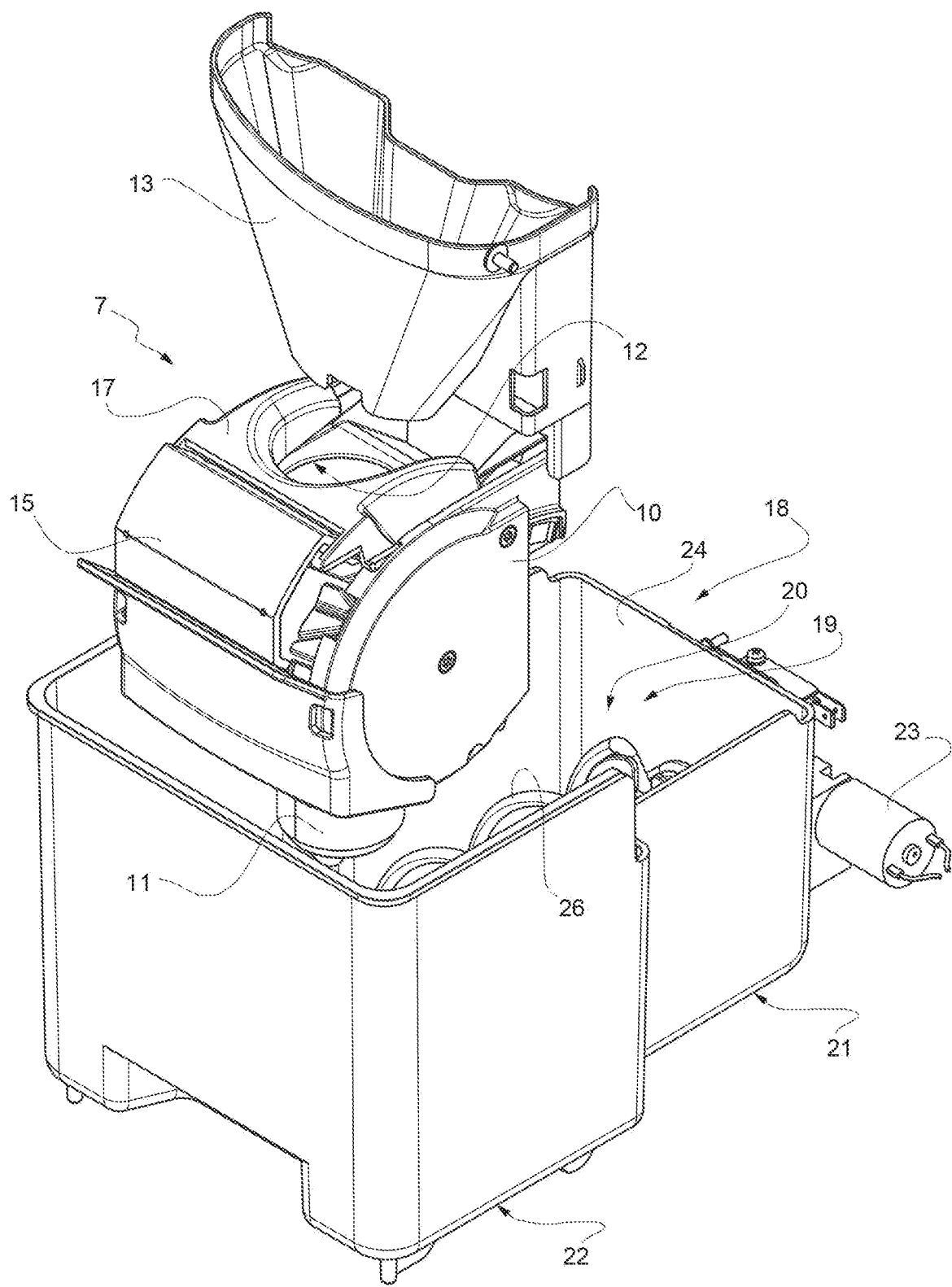
FIG. 2 shows, in an enlarged scale, a detail of FIG. 1.
Figure 3:
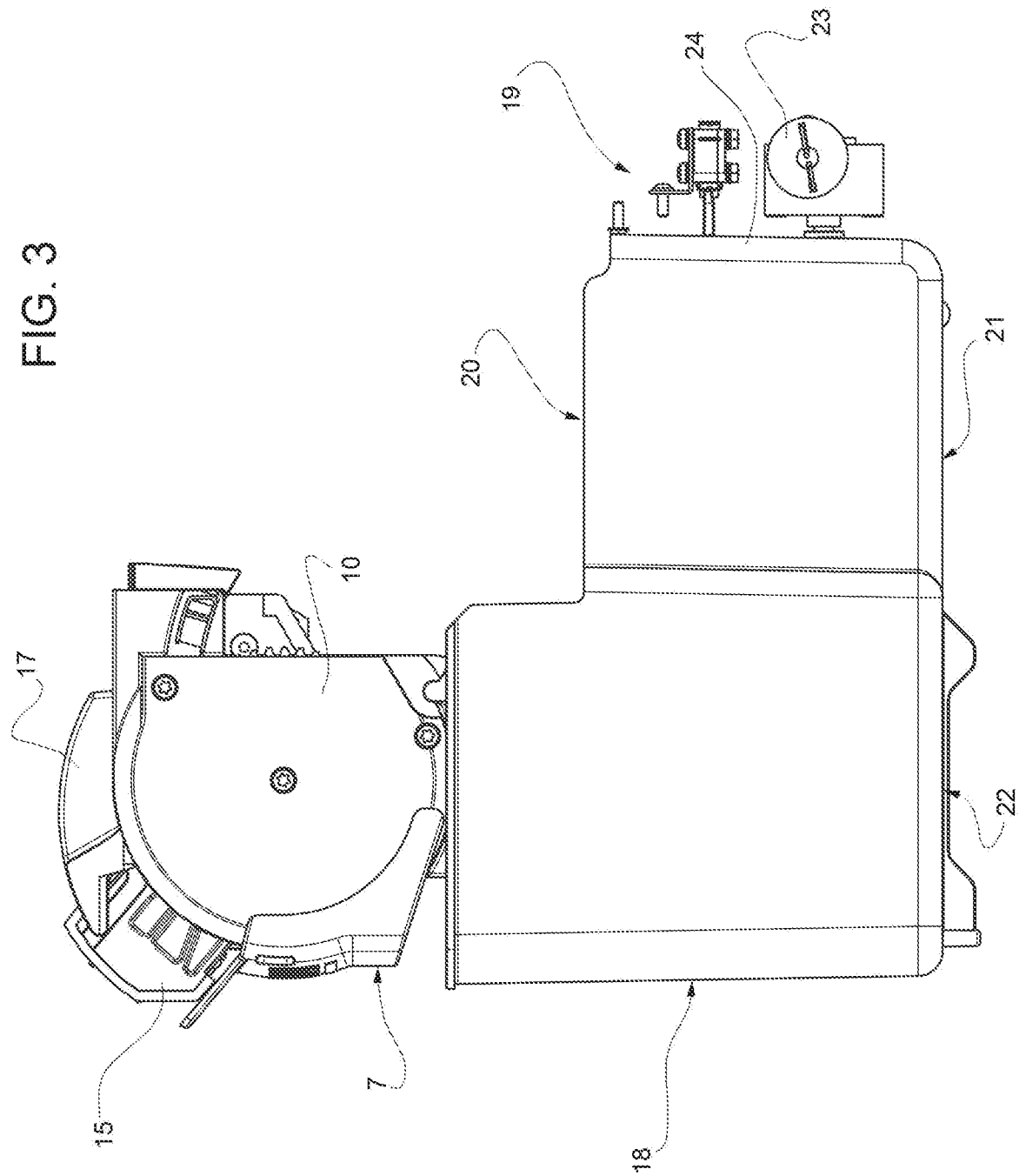
FIG. 3 is a side elevation view of the detail of FIG. 2.
Figure 4:
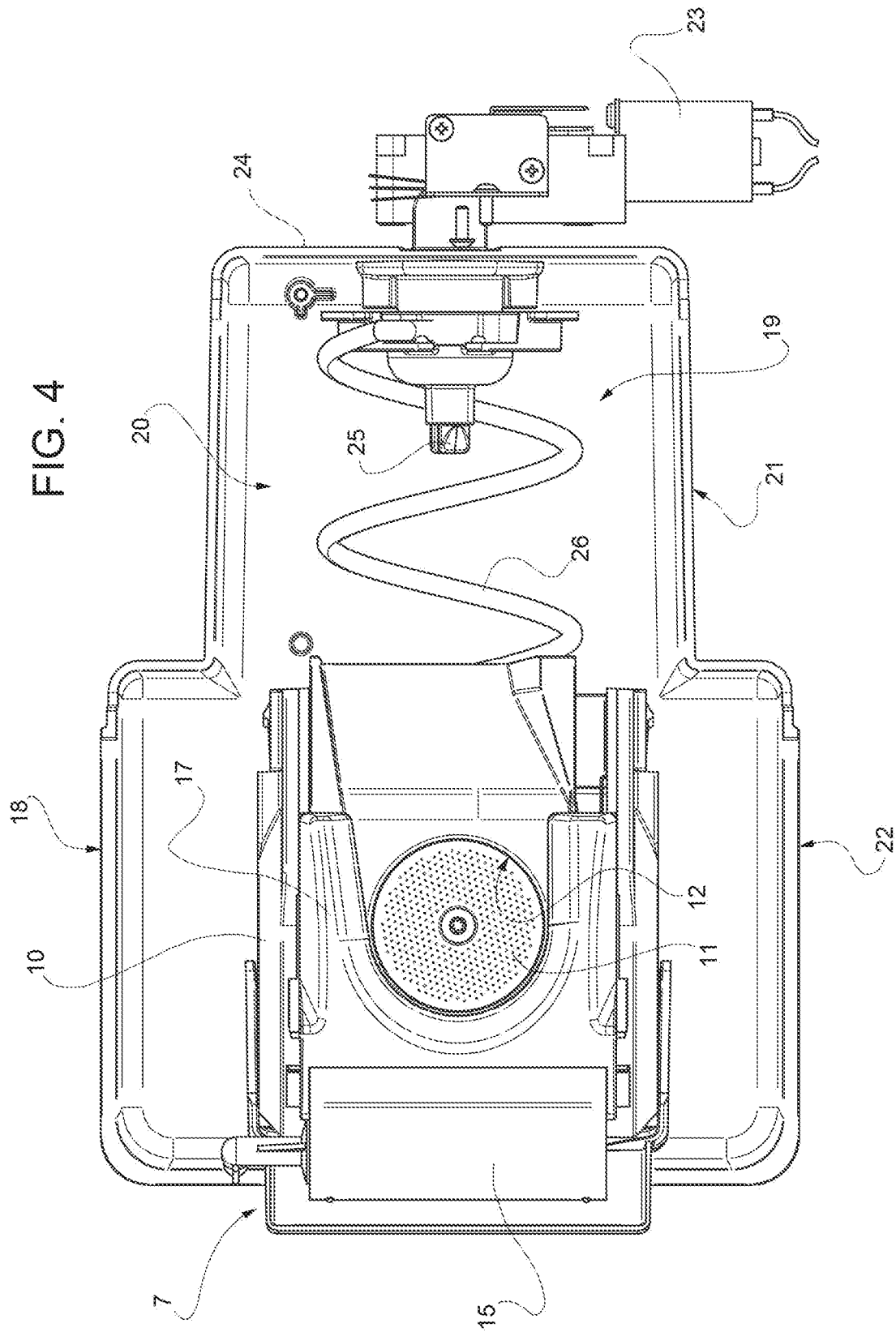
FIG. 4 is a plan view of the detail of FIG. 2.

With reference to FIG. 1, reference numeral 1 designates, as a whole, an automatic beverage preparation machine.

The machine 1 comprises a rigid outer casing 2, the front wall of which supports a beverage user-selection push-button panel 3, a beverage dispensing unit 4, and an extractable tray 5, which is arranged beneath the beverage dispensing unit 4 and is bounded at the top by a grid 6 that defines a horizontal stationary surface for supporting a cup or other beverage container (not shown).

The machine 1 further comprises a plurality of functional units for the production of beverages, which are housed in the casing 2 and are provided with respective outlets (not shown) that are in fluidic communication with the beverage dispensing unit 4.

The functional units of the machine 1 comprise at least one brewing device 7 operable to produce a beverage by pressure percolation of an anhydrous powder material, in particular coffee powder, for the production of espresso and/or long coffee.

Preferably, the functional units of the machine 1 further comprise one or more mixers (of a known type and not shown) for the production of so-called instant beverages obtained by dissolving in a liquid, typically hot water, one or more powder materials stored in respective containers 8 in the machine 1.

Exemplarily, the brewing device 7 described herein and shown in FIGS. 1 to 4 is a brewing device of the type described in EP 1005821 B, in particular in the embodiment shown in FIGS. 9 to 17, to which reference may be made for a detailed description of the features thereof.

Generally, the brewing device 7 comprises a brewing cylinder 10 having a substantially vertical axis, and a piston 11, which is slidably arranged in the brewing cylinder 10 and defines, with the brewing cylinder 10, a percolation chamber having an upper opening 12 formed on the top of the brewing cylinder 10 and facing an outlet 13 of a hopper 14 (FIGS. 1 and 2) intended to receive, during operation, the material to be brewed, in this case coffee powder.

The brewing device 7 further comprises a movable lid 15, which is mounted on the brewing cylinder 10 and is connected to actuator means (not shown) operable to displace the brewing cylinder 10 in a direction generally transverse to the axis of the brewing cylinder 10, between a normal inoperative position (illustrated in the attached figures), in which it leaves the opening 12 accessible, and an operative position, in which it engages the opening 12 to seal the percolation chamber.

When, during operation, a beverage preparation cycle begins as a result of a beverage selection made by a user, a certain amount of coffee powder is fed into the percolation chamber, the lid 15 is displaced from the inoperative position to the operative position and the piston is lifted up to compress the coffee powder to a predetermined degree of compaction. Subsequently, through a conduit normally formed in the piston 11, pressurized hot water is fed into the percolation chamber and the brewed beverage flows out of the percolation chamber through a discharge duct, preferably formed in the lid 15 and/or in the cylinder 10.

After the beverage has been dispensed, the lid 15 is displaced back to the inoperative position and the piston 11 is further lifted up to the level of the opening 12 of the percolation chamber so as to expel out of the opening 12 the exhausted powder material 16, which, as a result of the compression and percolation, is in the form of a relatively compact coffee powder cake.

In order to discharge the exhausted powder material 16 from the brewing device 7, the latter is provided with a scraping device 17 rigidly connected to the lid 15, on the side facing the opening 12.

The scraping device 17 is shaped and sized so that when, during operation, at the end of the beverage dispensing process and after the piston 11 with the exhausted powder material 16 thereon has been lifted up to the opening 12, the lid 15 is displaced from the inoperative to the operative position, a front edge of the scraping device 17 slides on the head of the piston 11, which results in the exhausted powder material 16 being swept away from the opening 12 until it falls outside the brewing device 7 in the form of compact cakes of exhausted powder material.

The brewing residues expelled from the brewing device 7 fall into a collection container 18, which is generally cup-shaped, with the opening facing upwards, is arranged underneath the brewing device 7, and carries a dispensing or conveying device 19, whose function is to facilitate the fragmentation of the exhausted coffee powder cakes that fall into the collection container 18 and redistribute the exhausted powder material 16 in the collection container 18 so as to prevent the exhausted powder material 16 to pile up to such an extent as to interfere with the brewing device 7 above.

In particular, the collection container 18 has a receiving zone 20 at which the exhausted powder material 16 discharged from the brewing device 7 falls, and the conveying device 19 is configured to move the exhausted powder material 16 by displacing it away from the receiving zone 20 towards the remaining volume of the collection container 18.

Being understood that the receiving zone 20 is always at an outlet of the falling path of the exhausted powder material, the shape of the collection container 18 and the position thereof with respect to the brewing device 7 may be varied depending on the space available inside the machine 1.

According to the preferred embodiment illustrated in the attached figures, the collection container 18 comprises a generally rectangular vessel, which has a first portion 21 facing the falling path and including the receiving zone 20, and a second portion 22 arranged just below the brewing device 7 to collect any liquid residues which may leak from the brewing device 7. As will be apparent in the following, the second portion 22 defines, within the collection container 18, a storage zone adapted to receive and contain the exhausted powder material 16 carried by the conveying device 19.

The conveying device 19 comprises an electric motor 23 mounted on the outside of an end wall 24 of the first portion 21 and having a drive shaft 25, which extends through the wall 24 and is mounted to a small plate for the attachment of a helical feed device 26 having a substantially horizontal axis and also being part of the conveying device 19. Preferably, the electric motor 23 is mounted on the inside of the machine 1 in a fixed position and the drive shaft 25 is connected to the helical feed device 26 via a fast removable connection, which allows an operator to easily and quickly remove the collection container 18 from the electric motor 23 in order to extract it from the machine 1 and carry out the emptying and cleaning operations. In turn, the helical feed device 26 is removably mounted on the collection container 18 to facilitate any necessary, more accurate, maintenance and/or cleaning operations.

Figure 5:
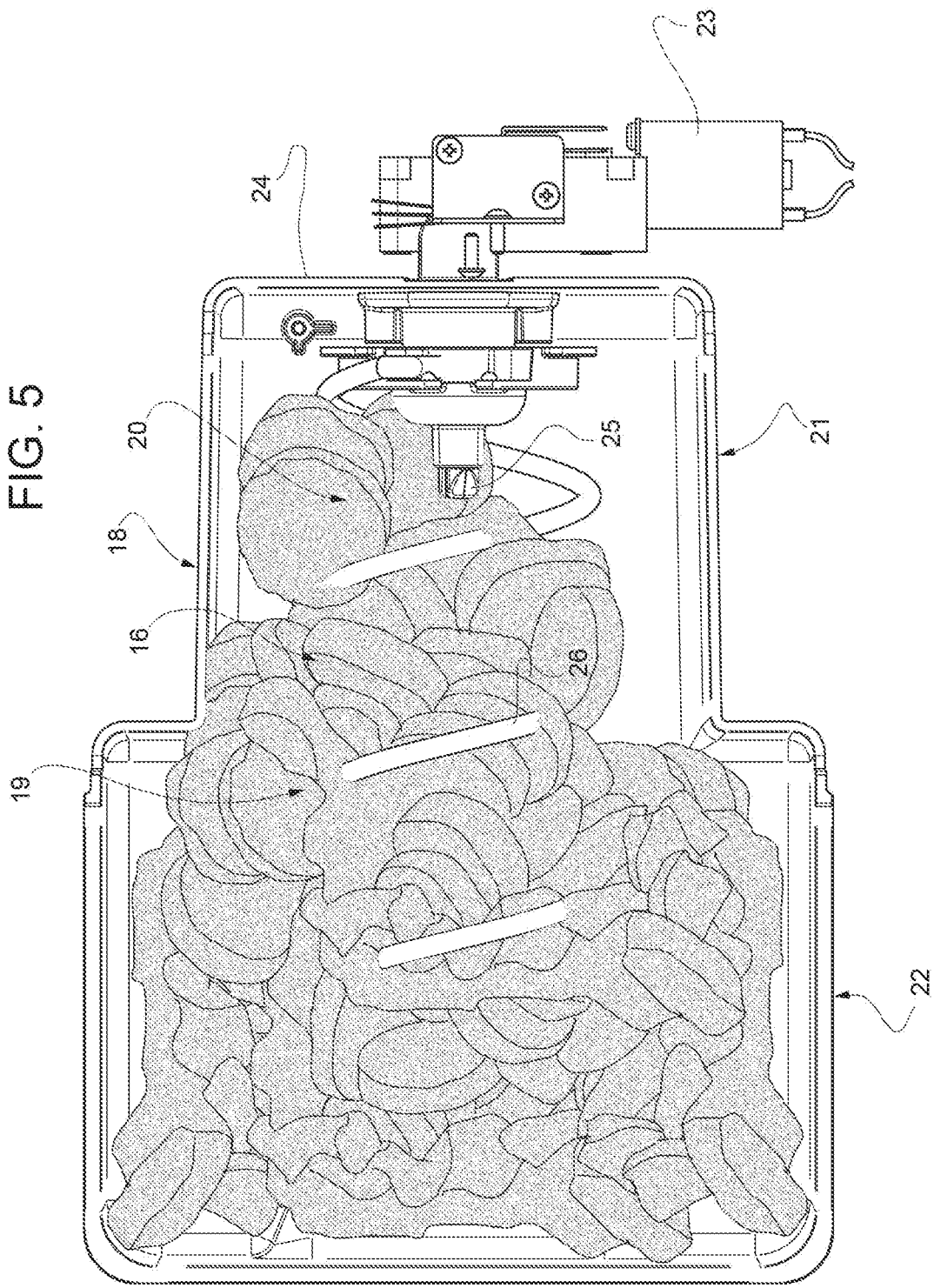
FIG. 5 is a plan view of the detail of FIG. 2, with parts removed for clarity.

As shown in FIG. 5, the helical feed device 26 extends from the receiving zone 20 to the second portion 22 so that, during operation, the exhausted powder material 16 falls into the receiving zone 20, between the first coils of the helical feed device 26. Preferably, the helical feed device 26 extends up to about ⅔ of the length of the collection container 18. When the helical feed device 26 is rotated, the exhausted powder material 16 is pushed, due to the translational feed motion of the helical feed device 26, from the receiving zone 20 towards the inside of the collection container 18 and is distributed, in this way, throughout the remaining internal volume of the collection container 18.

According to non-illustrated variants, the conveying device 19 may be different from that of the illustrated and implemented example. It can be any other feed device which is able to drag the material towards the inside of the collection container 18 so as to prevent the exhausted powder material 16 from excessively piling up in the receiving zone 20, thereby preventing part of the exhausted powder material 16 from falling out of the collection container 18 and soiling other components of the machine 1. In other words, the conveying device 19 allows the capacity of the collection container 18 to be completely exploited and, thus, the need for frequent interventions by an operator to empty the collection container 18 to be eliminated.

The conveying device 19 may have, for example, the shape of a screw.

The conveying device 19 is connected to an electronic control unit (not shown) of the machine 1, which is designed to control the operation of the conveying device 19 so as to operate the helical feed device 26, or a similar feed device, whenever exhausted powder material 16 is discharged at the end of the respective dispensing cycle, or only after a certain number of dispensing cycles of the brewing device 7, or at predetermined time intervals.

To complete and clarify the foregoing, it should be emphasized that the brewing device described with reference to the illustrated embodiment is merely exemplary and any other brewing device could be associated with the collection container 18 provided it is positioned, with respect to the collection container 18 itself, so that the exhausted powder material 16 falls into the receiving zone 20.

In this regard, importantly, the fact that the collection container 18 carries the conveying device 19 and the latter is therefore completely independent from the brewing device 7 has the advantage that the present invention can also be implemented on machines already on the market by providing the existing collection container with a conveying device of the type described above. A further advantage is that the collection container 18 must not necessarily be positioned completely underneath the brewing device, but can also be arranged and shaped in the most convenient manner to optimize the space available inside the machine 1, it being sufficient that the exhausted powder material 16 reaches, by vertical free fall or by guidance, the receiving zone 20 of the collection container 18.

The invention claimed is:

1. A beverage preparation machine, comprising:
   brewing device to prepare a beverage from a compacted powder brewing material during a brewing cycle and to discharge a solid residual brewing material at an end of each brewing cycle; and
   a collection container arranged at least partially beneath the brewing device to collect the solid residual brewing material discharged by the brewing device, the collection container including:
      a receiving zone to receive the solid residual brewing material discharged by the brewing device;
      a storage zone to store the solid residual brewing material; and
      a conveyor configured to convey, without liquid addition, at least part of the solid residual brewing material away from the receiving zone and into the storage zone to prevent the solid residual brewing material from piling up at the receiving zone.

2. The brewing preparation machine according to claim 1, wherein the conveyor is further configured to convey the solid residual brewing material away from the receiving zone in a horizontal direction.

3. The brewing preparation machine according to claim 1, wherein the conveyor comprises a helical feed device.

4. The brewing preparation machine according to claim 3, wherein the helical feed device is arranged in the collection container such that, in a forward direction of the helical feed device first coils are at the receiving zone.

5. The brewing preparation machine according to claim 1, wherein the conveyor is further configured to at least partially break up the solid residual brewing material during conveyance from the receiving zone to the storage zone.

6. The brewing preparation machine according to claim 5, wherein at least the storage zone of the collection chamber is located beneath the brewing device to collect any liquid residues which may leak from the brewing device in addition to storing the broken up solid residual brewing material.

* * * * *